(12) United States Patent
Rohlmeier et al.

(10) Patent No.: US 10,407,862 B1
(45) Date of Patent: Sep. 10, 2019

(54) SUBTERRANEAN FLUID TRANSPORT SYSTEM AND METHOD OF INSTALLATION

(71) Applicants: Grant M. Rohlmeier, Jones, OK (US); H. Warren Johnson, Oklahoma City, OK (US)

(72) Inventors: Grant M. Rohlmeier, Jones, OK (US); H. Warren Johnson, Oklahoma City, OK (US)

(*) Notice: Subject to any disclaimer, the term of this patent is extended or adjusted under 35 U.S.C. 154(b) by 0 days.

(21) Appl. No.: 16/021,135

(22) Filed: Jun. 28, 2018

(51) Int. Cl.
*F16L 9/18* (2006.01)
*E02D 29/00* (2006.01)
*E21B 43/00* (2006.01)
*F16L 1/028* (2006.01)

(52) U.S. Cl.
CPC .............. *E02D 29/10* (2013.01); *E21B 43/00* (2013.01); *F16L 1/028* (2013.01); *F16L 9/18* (2013.01)

(58) Field of Classification Search
CPC ........ F16L 9/18; F16L 55/1656; E21B 17/203
USPC ......... 405/184, 184.2, 184.4, 159, 160, 161; 138/104, 111, 112, 113, 114, 115
See application file for complete search history.

(56) References Cited

U.S. PATENT DOCUMENTS

| | | | |
|---|---|---|---|
| 6,963,031 B2 | 11/2005 | Gladfelter et al. | |
| 6,969,216 B2* | 11/2005 | Driver | F16L 55/1651 138/97 |
| 8,844,577 B2* | 9/2014 | Kiest, Jr. | F16L 55/1653 138/104 |
| 2002/0044837 A1* | 4/2002 | Paletta | E03F 5/022 405/184.3 |
| 2004/0016468 A1* | 1/2004 | Toliver | F16L 11/15 138/115 |
| 2004/0112452 A1* | 6/2004 | Tan | F16L 9/133 138/124 |
| 2005/0117973 A1* | 6/2005 | Nelson | F16L 1/036 405/184.5 |
| 2007/0246118 A1* | 10/2007 | Wagner | F16L 11/11 138/121 |
| 2010/0108169 A1* | 5/2010 | Frohne | F16L 7/00 138/112 |
| 2014/0116554 A1* | 5/2014 | Zeng | E03F 7/00 137/861 |

OTHER PUBLICATIONS

Mandals, Brochure, World Class Lay-Flat Hoses, 2015.
ADS Installation Guide, 2008.

* cited by examiner

*Primary Examiner* — Carib A Oquendo
(74) *Attorney, Agent, or Firm* — D. Ward Hobson

(57) ABSTRACT

A subterranean fluid transport system, flange assembly and method of installation is disclosed. In some embodiments, the subterranean fluid transport system includes a pipe segment with a rigid outer surface and a flexible inner sleeve positioned within the borehole of the pipe segment. The flexible inner sleeve configured to expand and contract within the borehole of the pipe segment when fluid is transported therethrough.

3 Claims, 4 Drawing Sheets

SUBTERRANEAN FLUID TRANSPORT SYSTEM AND METHOD OF INSTALLATION

FIELD OF INVENTION

The invention is in the technical field of subterranean fluid transport, delivery and transfer (whether in liquid or gaseous state) through a novel subterranean pipeline system and method of installation. The invention pertains generally to hoses, pipes, tubes, connections and flanges, of all manner of composition, the combination of which creates the subterranean pipeline system, flange assembly and method of installation described and claimed herein.

BACKGROUND

Throughout industry, in all manner of types and character, in all phases of each, be it agriculture, mining, energy and the like, large transfers of fluid both intermittent and continuous are required. Traditional fluid transfer systems can range from hundreds of feet to miles of differing diameters, compositions, combinations, design pressure ratings and configurations. There are numerous disadvantages in such traditional fluid transfer systems, including but not limited to, the lack of capacity of tank trucks, a lack of conditioning facilities at loading sites, inefficiencies in installation time equipment and connections, and the cost and expense of metal and plastic tube and pipe and the inability to bury flexible, collapsible pipe, tube or hose for subterranean use. Additionally, there is a lack of early leak detection and warning systems related thereto.

Traditional below ground fluid transport pipelines are constructed from a series of interconnected pipe formed from a rigid material such as steel designed to retain its shape when buried below a ground surface. In contrast, traditional above ground fluid transport pipelines are often constructed from a flexible material formed from a series of interconnected tubes or hoses. The flexible tubes or hoses are configured to expand when fluid is transported therethrough and contract when fluid is removed therefrom (often referred to as "lay-flat" hoses).

Traditional above ground lay-flat hose systems have numerous advantages over traditional below ground rigid pipe systems, in terms of amount of material used, cost of material, ease of use, and efficiency of storage and transportation for example. Unfortunately, however, such traditional lay-flat hose systems and methods of use are unsuitable for subterranean use because the ground prevents the flexible lay-flat hose system from properly expanding when filled with fluid and properly contracting when fluid is removed therefrom.

To that end, it would be advantageous to provide an improved subterranean fluid transport system having a pipe segment with a rigid outer surface and a flexible inner sleeve positioned within the borehole of the pipe segment, the flexible inner sleeve configured to expand and contract within the borehole of the pipe segment when fluid is transported therethrough. Thus, providing numerous advantages over traditional subterranean pipeline systems. It is to such an improved subterranean fluid transport system, flange assembly and to methods for using thereof that exemplary embodiments of the inventive concepts disclosed and claimed herein are directed.

SUMMARY OF THE INVENTION

There are numerous conditions that make the transfer of fluid via tanker trucks, underground metal, plastic pipes and lay-flat hose inefficient and impractical. Furthermore for the vast majority of installations there is lack of early leak detection and warning systems to warn workers in construction, farming or other industries that dig, bore, plow or move earth that a subterranean fluid transfer line is present. The disclosed and claimed subterranean pipeline system, flange assembly and method of installation solves these and other problems associated with such traditional fluid transfer systems.

The disclosed and claimed subterranean pipeline system, flange assembly and method of installation can handle volumes of fluid that traditional fluid transfer systems cannot due to the ability to correctly size and transfer various volumes of fluid. The disclosed and claimed subterranean pipeline system, flange assembly and method of installation reduces the installation time associated with traditional fluid transfer systems and lowers the cost of material for fluid transfer lines by removing the necessity of welding every 30-40 feet to connect pipe segments as well as removing the potential for failure associated with each such weld. The disclosed and claimed subterranean pipeline system, flange assembly and method of installation solves the inability to bury flexible hoses and pipes below a ground surface. It is not practical to bury flexible hoses and pipes below a ground surface because such flexible pipes and hoses cannot be buried pressurized and if buried in a de-pressurized state the weight of the ground and soil above prevents such traditional flexible pipes and hoses from properly functioning as designed.

The disclosed and claimed subterranean pipeline system, flange assembly and method of installation solves these problems through a novel system having at least one pipe segment with a rigid outer surface and a flexible inner sleeve positioned therein. The pipe segment having a rigid outer surface provides strength, support and protection for the flexible inner sleeve containing the fluid. The pipe segment having a rigid outer surface also provides an early detection and warning needed to protect people, property, livestock and the environment from a leak in the flexible inner sleeve. For example, in use, and upon a worker or machine accidentally hitting and breaking the rigid outer surface of the pipe segment, the flexible inner sleeve positioned therein will remain protected. Further, the worker will have notice, by visually seeing, hearing or feeling the break to the rigid outer surface of the pipe segment, thus enabling the worker to stop work before further damage is done. Occasionally there are emergencies that require quick action to protect life, property and the environment. The disclosed and claimed subterranean pipeline system, flange assembly and method of installation is quick, safe and cost effective, especially when compared to traditional subterranean fluid transport systems.

In accordance with one embodiment of the inventive concepts disclosed herein, there is provided a subterranean fluid transport system for moving fluid from one location to another. The subterranean fluid transport system consists of at least one pipe segment having a rigid outer surface and a flexible inner sleeve positioned in the borehole of the at least one pipe segment. The flexible inner sleeve must be compatible with the fluid to be transferred and rated for the pressure needed. The at least one pipe segment having a rigid outer surface, may, but need not be, rated for the pressure required for the fluid that is transferred through the flexible inner sleeve. Thus, providing significant cost savings in terms of required material for the subterranean fluid transport system compared to traditional.

In accordance with another embodiment of the inventive concepts disclosed herein, the subterranean fluid transport system further includes a system controller and an automated alarm system in communication with the system controller. The automated alarm system for generating an alarm at a location remote from the at least one pipe segment upon detecting fluid in the borehole of the at least one pipe segment.

In accordance with another embodiment of the inventive concepts disclosed herein, there is provided a method of installing the subterranean fluid transport system. The method including the steps of: (i) digging a trench below a ground surface; (ii) positioning a plurality of pipe segments into the trench, wherein the plurality of pipe segments are connected together to form a continuous pipeline having a rigid outer surface, a smooth inner surface, a first end, a second end, and a borehole extending between the first end and the second end of the pipeline; and (iii) positioning a plurality of flexible inner sleeves in the borehole of the pipeline, the plurality of flexible inner sleeves connected together to form a continuous sleeve having a first end, a second end and a borehole extending between the first end and the second end of the sleeve, wherein the sleeve expands when the borehole of the sleeve is filled with a fluid and contracts when the fluid is removed therefrom.

In accordance with another embodiment of the inventive concepts disclosed herein, there is provided a flange assembly for connecting a plurality of pipe segments for subterranean fluid transport. The flange assembly including a clamp ring configured to be positioned coaxially over a pipe end. The clamp ring having a first end, a second end, an inner surface and an outer surface defining a borehole extending between the first end and the second end of the clamp ring. The outer surface of the clamp ring having grooves embedded therein. The flange assembly also including a flange member configured to be received over the clamp ring and detachably connected thereto. The flange member having a first end, a second end, an inner surface and an outer surface defining a borehole extending between the first end and the second end of the flange member. The inner surface of the flange member having grooves embedded therein. Wherein the grooves of the clamp ring and the grooves of the flange member are configured to be detachably connected so as to lock the clamp ring to the flange member in a desired position such that fluid may flow therethrough.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
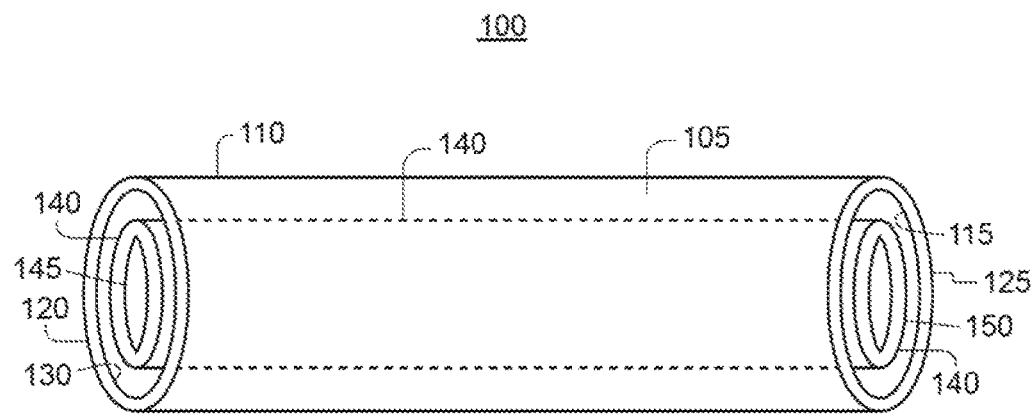
FIG. 1 is a side perspective view of an exemplary embodiment of a subterranean fluid transport system according to the inventive concepts disclosed herein.

Before explaining at least one embodiment of the inventive concepts disclosed herein in detail, it is to be understood that the inventive concepts are not limited in their application to the details of construction and the arrangements of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As used herein, the terms "comprises," "comprising," "includes," "including," "has," "having," or any other variation thereof, are intended to cover a non-exclusive inclusion. For example, a system, assembly, method, process, article, or apparatus that comprises a list of elements or steps is not necessarily limited to only those elements or steps but may include other elements and steps not expressly listed.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
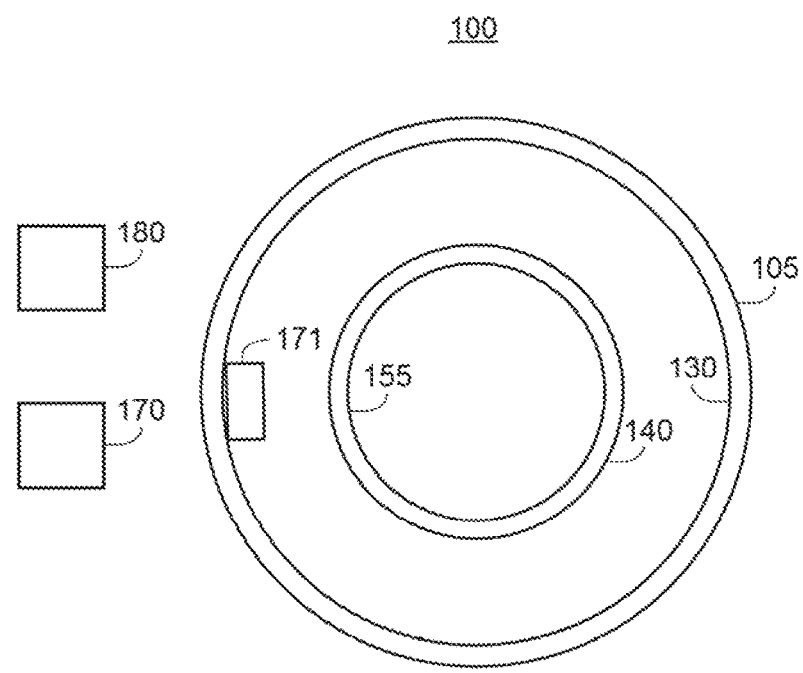
FIG. 2 is a front perspective view of the subterranean fluid transport system of FIG. 1.

Referring now to FIGS. 1-2, shown therein is an exemplary embodiment of a subterranean fluid transport system (100) comprising at least one pipe segment (105). The at least one pipe segment (105) having a rigid outer surface (110), a smooth inner surface (115), a first end (120), a second end (125), and a borehole (130) extending between the first end (120) and the second end (125). The subterranean fluid transport system (100) includes at least one flexible inner sleeve (140) positioned in the borehole (130) of the at least one pipe segment (105). The at least one flexible inner sleeve (140) having a first end (145), a second end (150) and a borehole (155) extending between the first end (145) and the second end (150) of the at least one flexible inner sleeve (140). Wherein the at least one flexible inner sleeve (140) expands when the borehole (155) of the at least one flexible inner sleeve (140) is filled with a fluid and contracts when the fluid is removed therefrom.

The at least one pipe segment (105) has a rigid outer surface (110), a smooth inner surface (115), a first end (120), a second end (125), and a borehole (130) extending between the first end (120) and the second end (125). The at least one pipe segment (105) may be constructed from any material sufficiently rigid to maintain its shape and structure when buried below a ground surface. For example, the pipe segment (105) may be constructed from metals, alloys, non-metals, steel, titanium, polyvinyl chloride (PVC), carbon fiber, high density polyethylene (HDPE) plastics, polymers, resins, ceramics, composite materials, combinations thereof and the like. As will be appreciated by one of ordinary skill in the art, the shape of the pipe segment (105) is generally tubular, but may be rectangular or any other desired shape sufficient to house the flexible inner sleeve (140) therein such that fluid can flow therethrough.

The at least one flexible inner sleeve (140) is positioned in the borehole (130) of the at least one pipe segment (105). The at least one flexible inner sleeve (140) has a first end (145), a second end (150) and a borehole (155) extending between the first end (145) and the second end (150) of the at least one flexible inner sleeve (140). The at least one flexible inner sleeve (140) expands when the borehole (155) of the at least one flexible inner sleeve (140) is filled with a fluid and contracts when the fluid is removed therefrom.

The at least one flexible inner sleeve (140) may be constructed from any flexible material that is sufficient to contract or lay flat when de-pressurized and fluid is not flowing therethrough and configured to expand when pressurized and fluid flows therethrough. For example, the flexible inner sleeve (140) may be formed from combinations of woven plastics, fibers, textiles, yarn, polyester, polyurethane, thermoplastic polyurethane, thermoplastic, rubber, ethylene propylene diene monomer (EPDM) rubber, nitrile rubber, carbon fiber, resins, polyvinyl chloride (PVC), high density polyethylene (HDPE), light density polyethylene (LDPE), medium density polyethylene (MDPE), polyethylene, hytrel, polymers, metals alloys, non-metals, steel, titanium, carbon fiber, plastics, ceramics, composite materials, combinations thereof and the like. As will be appreciated by one of ordinary skill in the art, the shape of the flexible inner sleeve (140) is generally tubular when in an expanded or pressurized state and generally flat when in a de-pressurized state without fluid. It should be understood, however, that the shape of the flexible inner sleeve (140) may be any shape sufficient to expand and contract and permit fluid to flow therethrough, including but not limited to a tubular, rectangular or other desired shape. As will be appreciated by one of ordinary skill in the art having the benefit of the instant disclosure, the flexible inner sleeve (140) can be made by any suitable process. However, an extruded-through the weave process wherein a thermoplastic polyurethane material is extruded through a polyester weave is preferable.

As shown in FIG. 2, in some embodiments, the subterranean fluid transport system (100) also includes a system controller (170) and an automated alarm system (180) in communication with the system controller (170). The automated alarm system (180) for generating an alarm at a location remote from the at least one pipe segment (105) upon detecting fluid in the borehole (130) of the at least one pipe segment (105).

The system controller (170) is a computer or similar electronic device for storing, sending, receiving, and processing data, typically in binary form, according to instructions given to it by a computer program. For example, the system controller (170) may be a computer constructed from a platform, that senses the environment by receiving input from sensors and that affects its surroundings by controlling actuators. The computer program for operating the system controller (170) may be written in Java, C+, or C++, or various other computer programming and source code languages known in the art. Computer programs to open or close valves and to receive signals from various sensors, are well known in the art and will not be described in detail herein to avoid unnecessarily complicating the instant disclosure.

In operation, the system controller (170) is positioned at a location remote from the pipe segment (105). The system controller (170) receives a signal from a fluid detection sensor (171) located in the pipe segment (105) indicative of the presence of fluid in the borehole (130) of the pipe segment (105). The system controller (170) then sends one or more signal to one or more valves in the subterranean fluid transport system (100), such as solenoid valves, configured to send and receive electronic signals, to automatically open and close the valves in the subterranean fluid transport system (100) and automatically shut off fluid flow in a desired area so as to permit work to be performed, a leak to be corrected and/or other work and operations to be performed along the pipeline. Solenoid valves are electromechanical devices used for controlling liquid or gas flow. A solenoid valve is generally controlled by electrical current, which is run through a coil. When the coil is synergized, a magnetic field is created, causing a plunger inside the coil to move, for example. Valves, such as solenoid valves, are well known in the art and will not be described in detail herein to avoid unnecessarily complicating the instant disclosure.

The system controller (170) may also send and receive signals to or from the automated alarm system (180). The automated alarm system (180) is a computer or other similar device configured to activate an alarm at a location remote from the subterranean fluid transport system (100). For example, a computer or computers located in a work vehicle, office location or other above ground location near or away from the location of the subterranean fluid transport system (100). In some embodiments, the automated alarm system 120 is activated by the system controller 105 to sound an alarm upon detection of fluid in the pipe segment (105), for example.

The signals transmitted and communicated between and among the system controller (170) and the automated alarm system (180) (as well as various other electronic components) may be transmitted in a variety of ways known in the art. For example, communications and signals may be transmitted, directly through wires or wirelessly through any type of network, public or private, cellular or the like and including a local area network (LAN) or a wide area network (WAN), Bluetooth®, or the communications may be made through the internet on the world wide web using an internet service provider. The internet is a global computer network providing a variety of information and communication facilities, consisting of interconnected networks using standardized communication protocols, for example.

Figure 3:
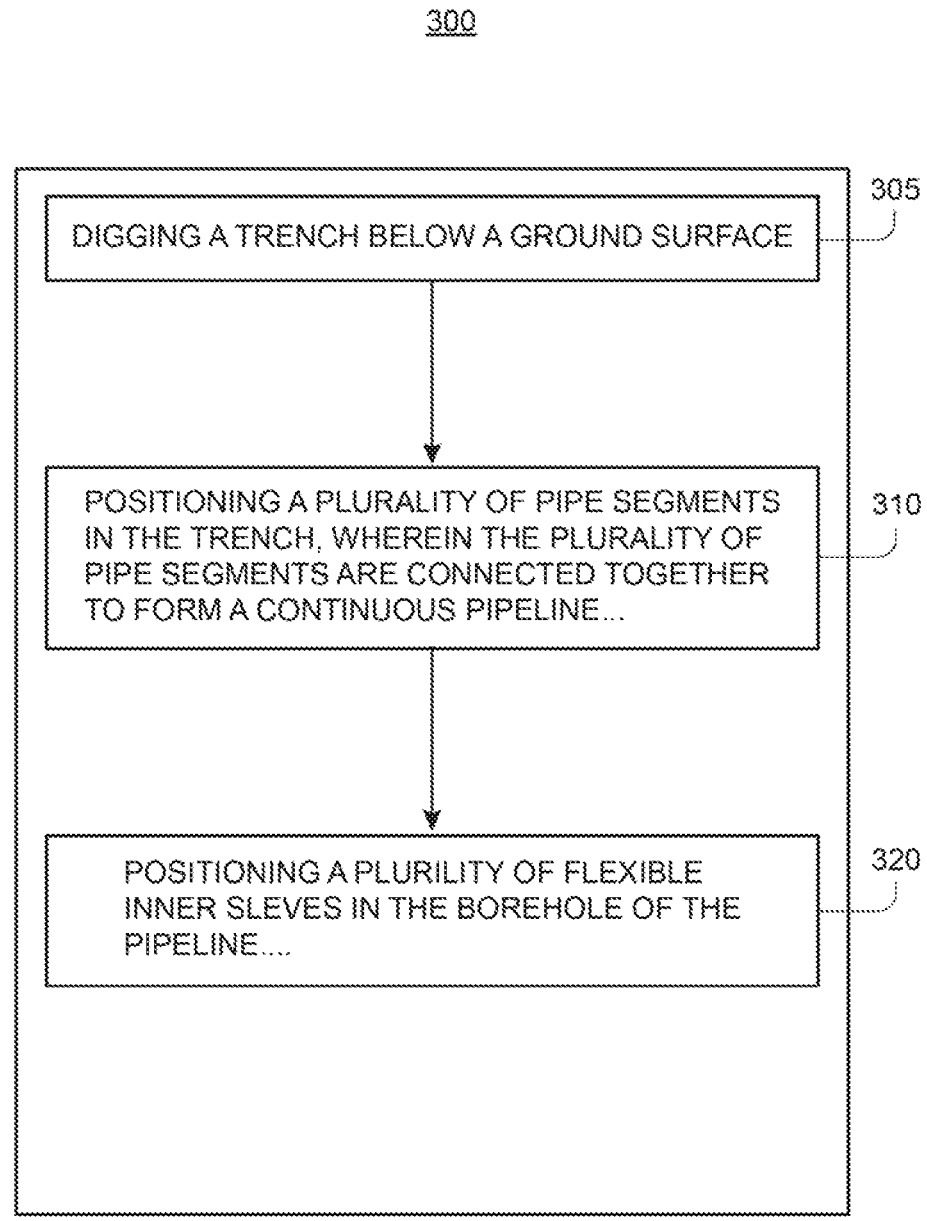
FIG. 3 is a diagram of a method of installing the subterranean fluid transport system of FIG. 1.

Referring now to FIG. 3, shown therein is an exemplary embodiment of a method (300) of installing a subterranean fluid transport system (100). The method including the steps of: (i) digging (305) a trench below a ground surface; (ii)

positioning (310) a plurality of pipe segments (105) into the trench, wherein the plurality of pipe segments (105) are connected together to form a continuous pipeline (107) having a rigid outer surface (110), a smooth inner surface (115), a first end (120), a second end (125), and a borehole (130) extending between the first end (120) and the second end (125) of the pipeline (107); and (iii) positioning (320) a plurality of flexible inner sleeves (140) in the borehole (130) of the pipeline (107). The plurality of flexible inner sleeves (140) are connected together to form a continuous sleeve (147) having a first end (145), a second end (150) and a borehole (155) extending between the first end (145) and the second end (150) of the sleeve (147). The sleeve (147) expands when the borehole (155) of the sleeve (147) is filled with a fluid and contracts when the fluid is removed therefrom.

In accordance with another embodiment of the inventive concepts disclosed herein, the subterranean fluid transport system (100) can be installed by a method wherein a trench is cut into the ground between a wellsite and a location remote from the well site, such as a disposal well. Next, a plurality of pipe segments (105) are laid into the trench. The pipe segments are connected together to form a continuous pipeline having an interior bore. A first end is of the pipeline is at the wellsite and a second end of the pipeline is at the remote location. In some embodiments, the entire trench is dug all at once before introduction of the pipe segments. In other embodiments, the trench is dug in portions and the pipe segments are added into the portions as they are dug.

A flexible inner sleeve (140) is pulled through the interior borehole (130) such that the flexible inner sleeve (140) extends from the first end to the second end of the pipeline. In some embodiments, this can be done sequentially. In such embodiments, the method comprises laying a first plurality of the pipe segments (105) into the trench and connecting the first plurality of the pipe segments (105). Subsequently, a first section of flexible inner sleeve (140) is pulled through the interior borehole (130) of the pipe segments (105) such that the flexible inner sleeve (140) extends from a first end to a second end of the plurality of pipe segments (105). A subsequent plurality of pipe segments (105) is laid into the trench and connected together. Also, the subsequent plurality of pipe segments (105) is connected with the first plurality of the pipe segments (105). Then, a subsequent section of flexible inner sleeve (140) is pulled through the interior borehole (130) of the subsequent plurality of pipe segments (105) laid in the trench. The subsequent section of flexible inner sleeve (140) is connected with the first section of flexible inner sleeve (140). The steps of adding subsequent pipe segments and subsequent lay-flat hose can be repeated until a continuous pipeline is formed having a first end of the pipeline at the wellsite and a second end of the pipeline at the remote location.

After or as the pipe segments (105) are laid in the trench, the pipe segments (105) can be coved with fill material, such as soil, sand, rock or combination thereof. In some embodiments, the beginning location may be a wellsite at which a fracturing process is being carried out and the ending location may be a disposal well in which wastewater from the fracturing process is being introduced, for example. In such embodiments, the method can further comprise introducing wastewater into a first end of the flexible inner sleeve (140) located at the wellsite and transmitting the wastewater through the flexible inner sleeve (140) as a pressurized fluid so as to place the flexible inner sleeve (140) into the expanded state and transmit the wastewater to the disposal well.

In accordance with another embodiment of the inventive concepts disclosed herein, there is provided a method of installing the subterranean fluid transport system (100). The method includes the steps: (a) cutting a trench in the ground between point A, the transferring or originating site, and point B the receiving or ending location; (b) laying the pipe segments (105) into the trench, wherein the pipe segments (105) are joined to form a continuous pipeline from point A to point B, having an interior borehole (130) of sufficient space to accommodate the flexible inner sleeve (140); and (c) pulling the flexible inner sleeve (140) through the borehole (130) of the pipe segment (105) while connecting the flexible inner sleeve (140) sections as needed to produce a complete subterranean fluid transport system (100) of appropriate pressure rating for which it is rated and that extends from beginning to end matching the exterior pipe segment (105) length.

In the above method each pipe segment (105) can be constructed of any rigid material sufficient to withstand the weight of the soil while maintaining the borehole (130) and without collapsing or impinging on the area through which the flexible inner sleeve (140) must pass.

In the above method each flexible inner sleeve (140) can be of any flexible material meeting the specifications for the type and pressure of fluid being transported. Depending on the material used the flexible inner sleeve (140) may have a collapsed or flat state during the method of installation or any time the line is depressurized. In such embodiments, the flexible inner sleeve (140) is pulled through the interior borehole (130) from start to finish.

In some embodiments, steps (b) and (c) of the method described above, further include: (i) laying a first plurality of pipe segments (105) into the trench; (ii) connecting the first plurality of these pipe segments (105); (iii) pulling a portion of the flexible inner sleeve (140) through the interior borehole (130) such that the flexible inner sleeve (140) extends out of both ends of the pipe segments (105); (iv) laying a subsequent plurality of pipe segments (105) into the trench; (v) connecting the new of pipe segments (105) together and connecting the them with the first pipe segments (105); (vi) pulling a subsequent section of flexible inner sleeve (140) through the interior borehole (130) such that the flexible inner sleeve (140) extends out of both ends of the existing pipe segments (105); (vii) connecting the subsequent section of flexible inner sleeves (140) with the first section of flexible inner sleeves (140); and (viii) repeating steps (iv) through (vii) until the outer pipe segments (105) are connected together to form the continuous subterranean fluid transport system (100) and wherein the sections of the flexible inner sleeve (140) are connected together and extend from beginning to end with the inner pipeline protruding from both ends of the pipe segments (105).

Figure 4:
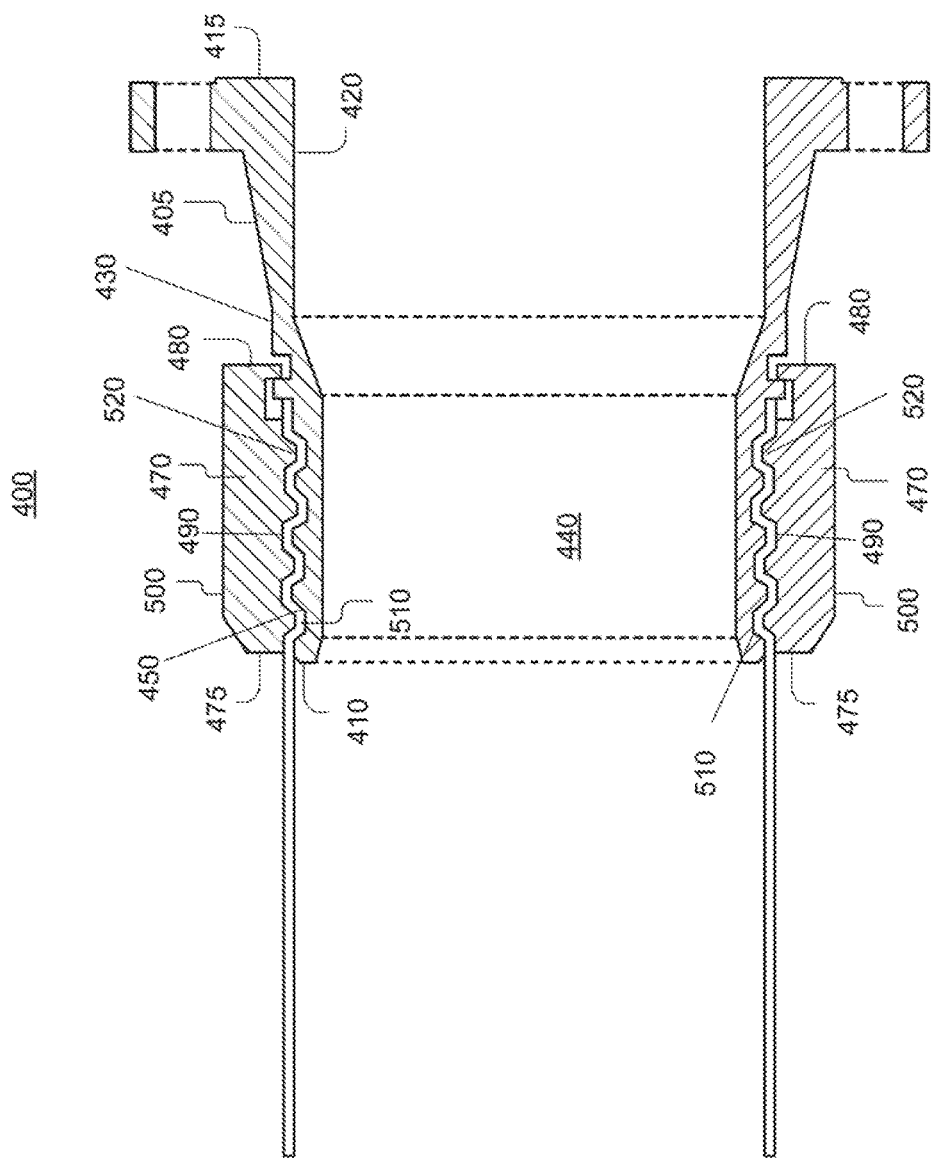
FIG. 4 is a perspective view of an exemplary embodiment of a flange assembly according to the inventive concepts disclosed herein.

Referring now to FIG. 4, shown therein is an exemplary embodiment of a flange assembly (400) for connecting a plurality of pipe segments (105) for subterranean fluid transport. The flange assembly (400) including a clamp ring (405) configured to be positioned coaxially over a pipe end. The clamp ring (405) having a first end (410), a second end (415), an inner surface (420) and an outer surface (430) defining a borehole (440) extending between the first end (410) and the second end (415) of the clamp ring (405). The outer surface (430) of the clamp ring (405) having grooves (450) embedded therein.

The flange assembly (400) further including a flange member (470) configured to be received over the clamp ring (405) and detachably connected thereto. The flange member (470) having a first end (475), a second end (480), an inner surface (490) and an outer surface (500) defining a borehole (510) extending between the first end (475) and the second end (480) of the flange member (470). The inner surface (490) of the flange member (470) having grooves (520) embedded therein. The grooves (450) of the clamp ring (405) and the grooves (520) of the flange member (470) are configured to be detachably connected so as to lock the clamp ring (405) to the flange member (470) in a desired position such that fluid may flow therethrough.

Figure 5:
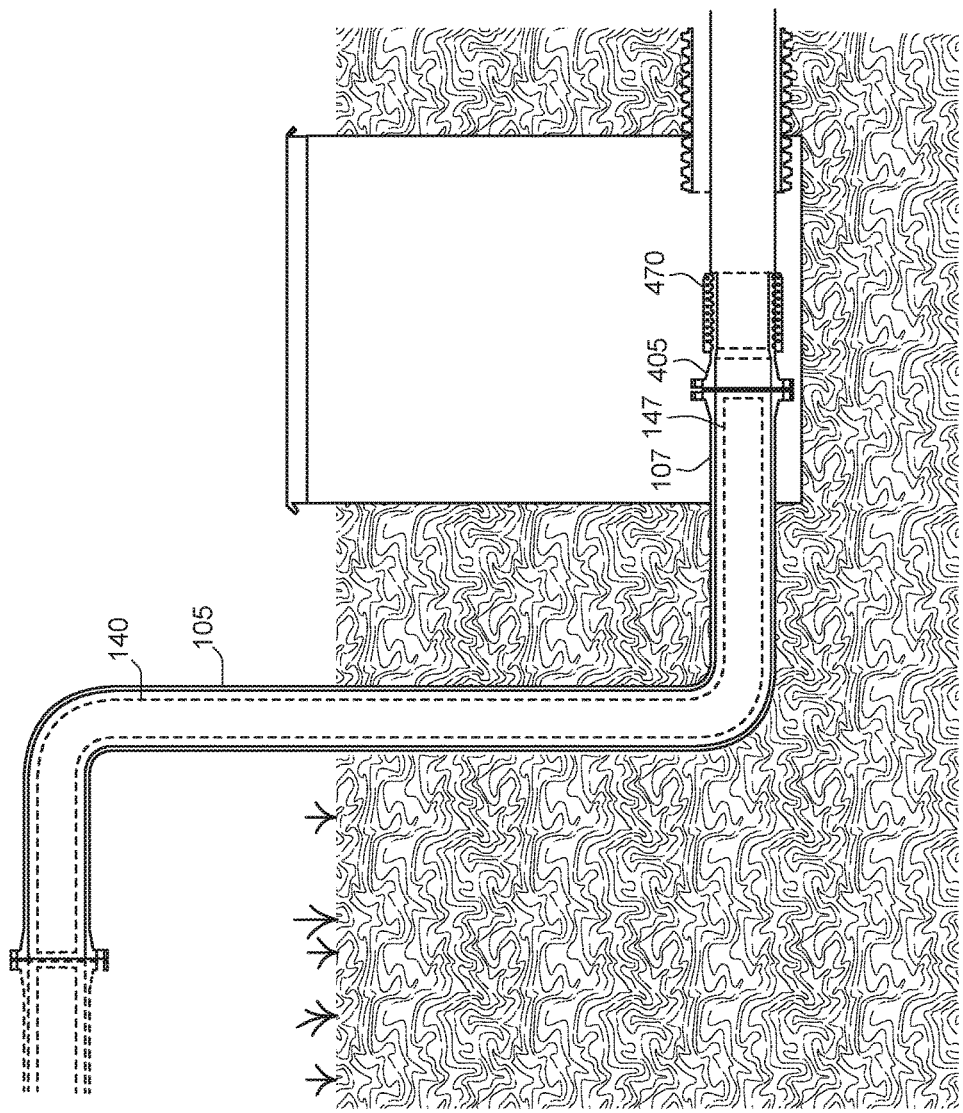
FIG. 5 is a perspective view of the subterranean fluid transport system of FIG. 1 and the flange assembly of FIG. 4 according to the inventive concepts disclosed herein.

Referring now to FIG. 5, shown therein is an exemplary embodiment of the subterranean fluid transport system (100) and the flange assembly (400) in use below a ground surface. Fluid may be obtained from one or more sources. Typically, fluid requires transportation over different distances, from a few hundred feet to many miles. For example, disposal of wastewater from oil and gas production activities, and fracturing operations more specifically, often requires transportation of the wastewater over comparable long distances, such as transportation to a wastewater disposal well.

Conventional methods of moving water over long distances involve extensive labor, time and transportation of, among other things, fixed-length pipes, fitting and pumps. For example, traditional high density polyethylene (HDPE) pipes have been used; however, use of such HDPE pipes requires considerable expense in the labor for transporting, installing and connecting the HDPE pipes. In order to achieve a suitable connection to prevent leaks, the HDPE pipe is typically connected by electrofusion, which is expensive and labor intensive. Electrofusion is a method of joining HDPE pipe and other plastic pipes using special fittings that have built-in electric heating elements, which are used to weld the joints together, for example. Additionally, HDPE pipe is rigid and requires special fittings and further electrofusion connections to handle turns, bends and slopes in the land. Traditional lay-flat hoses have been used above ground, such as for transporting water for fracturing operations. Traditional lay-flat hoses are flexible and can handle turns, bends, and slopes but the flexibility of such traditional lay-flat hoses also make them unsuitable for subterranean use. Above ground pipe and hoses are subject to numerous environmental hazards, including animals, human activities, rock or soil subsidence, for example.

As shown in FIG. 5, the inventive concepts disclosed herein are directed to a subterranean fluid transport system including at least one pipe segment (105) having a rigid outer surface (110) and having a flexible inner sleeve (140) positioned therein. In use, the pipe segment (105) having a rigid outer surface (110) is configured to withstand the pressure from being buried below soil and rock without substantial deformation. By "substantial deformation", it is meant that the pipe segment (105) will not deform sufficiently to adversely affect the flow of fluid through the flexible inner sleeve (140). More typically, the pipe segments will not deform out of a round or tubular cross-sectional shape.

The flexible inner sleeve (140) is sufficiently flexible to bend 90 degrees, 45 degrees, or 22.5 degrees, for example. Thus, elbow fittings are not required in order to have the flexible inner sleeve (140) make turns. Additionally, the flexible inner sleeve (140) can be stored and transported by winding it on reels or folding it into boxes; thus, it may be deployed in long segments ranging from 5 ft. long to about 700 ft. long, more typically the minimum lengths will be at least about 50 ft., or at least about 100 ft. long, or even at least about 200 ft. long. Lengths from about 200 ft. to about 500 ft. are typical. Nominal inner diameters ranging from about 3 inches to about 16 inches are typical; however, greater or lesser diameters can be used as will be appreciated by one of ordinary skill in the art having the benefit of the instant disclosure.

Because of its flexibility, the flexible inner sleeve (140) has a collapsed state when a pressurized fluid is not transmitted therethrough. In the collapsed state, the flexible inner sleeve (140) has a substantially flat configuration. When a pressurized fluid is being transmitted through the flexible inner sleeve (140), it takes on an expanded state having a substantially circular cross-sectional configuration. In the expanded state the flexible inner sleeve (140) has an outer diameter which is less than the inner diameter of the pipe segment (105).

The flexible inner sleeve (140) is configured to be used for long segments and quick connections. For example, each flexible inner sleeve (140) can be connected to a one or more flexible inner sleeves (140), such as sections 250 ft. long and connected together by traditional bolt-on-field connections, for example. Bolt-on-field connectors, typically comprise a cylindrical centerpiece with two outer ribbed portions. An end of a first flexible inner sleeve (140) fits over the first ribbed portion and an end of a second flexible inner sleeve (140) fits over the second ribbed portion, for example. Circular clamps can be positioned over the first and second ribbed portions, respectively, and bolted down so as to sandwich the ends of first flexible inner sleeve (140) and the second flexible inner sleeve (140) between the associated ribbed portion and clamp to lock the ends in place.

In use, the flexible inner sleeve (140) extends through the pipe segment (105), which is rigid so as to help resist the pressure associated with being buried below ground. As shown in FIG. 5, the at least one pipe segment (105) is buried in a subterranean trench with soil and/or rock partially covering the pipe segment (105). Pipe segment (105) thus protects the flexible inner sleeve (140) positioned in the borehole (130) of the pipe segment (105), while still allowing the flexible inner sleeve (140) to expand to its expanded state when filled with pressurized fluid and contract to a substantially flat state when the fluid is removed therefrom.

The subterranean fluid transport system (100) may comprise a plurality of pipe segments (105). The plurality of pipe segments (105) may be connected together to form a continuous pipeline having an interior borehole (130), which contains the flexible inner sleeve (140). Because the pipe segments (105) are rigid, they cannot easily bend; thus, they require elbow segments and must be stored and transported for use in smaller segments. Typically, pipe segments (105) will be less than 50 ft. in length and often from 10 ft. to 40 ft. in length. However, because the pipe segments (105) are not required to transmit pressurized fluid, i.e., the fluid is transmitted through the flexible inner sleeve (140) instead, the pipe segments (105) may, but are not required, to meet the same requirements for transporting pressurized fluid. Thus, the pipe segments (105) can be constructed from a lighter more cost effective material and may utilize quick, cost saving connections for connecting one pipe segment (105) to another pipe segment (105). For example, pipe segments (105) can be connected to each other using standard bell and spigot connections known in the art.

To connect a standard bell and spigot connection to a plurality of pipe segments (105), a bell portion of a first pipe segment (105) receives a spigot portion of a second pipe segment (105) in a friction hold. Traditional subterranean systems using rigid pipes typically requires connections that are electro-fused together because pressurized fluid could overcome the frictional hold and force pipe segments apart. Because electrofusion is not required for the inventive concepts disclosed herein, significant cost savings, in terms of material used and man-power for connecting pipe segments may be realized. As indicated herein, lighter pipe materials can be used for pipe segments (105) as a result. For example, each pipe segment (105) can be a drainage type pipe, such as a high-density polyethylene pipe (HDPE) used for drainage purposes. Preferred is an HDPE corrugated plastic drainage pipe, for example. Further, because the flexible inner sleeve (140) sections will typically be far longer in length than the sections of pipe segments (105), there will be far less flexible inner sleeve (130) sections to connect than pipe segment (105) sections to connect. Thus, providing additional cost and efficiency savings for the subterranean fluid transport system (100).

For example, a mile long piping system might require one hundred and fifty three pipe segments (105) of about 40 ft. each in length, but only about fifty three flexible inner sleeve (140) sections of about 100 ft. in length) and only about ten and a half flexible inner sleeve (140) sections of about 500 ft. in length. Since the flexible inner sleeve (140) sections are easily and readily connected by standard bolt-on-field type connections and because non-pressure rated pipe segment (105) can be connected by bell and spigot connections, the result is a substantial saving in cost and installation time over traditional pressure rated subterranean piping systems, such as HDPE piping systems connected by electrofusion.

It is to be appreciated that the subterranean fluid transport system (100) may be installed and used under a variety of different conditions and for the transportation of a variety of different fluids. Further, the fluid transport system (100) may be shipped fully assembled, fully or partially disassembled as will be readily appreciated by persons of ordinary skill in the art.

From the above description, it is clear that the inventive concepts disclosed herein are adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the broad scope of the inventive concepts disclosed herein and defined by the appended claims.

What is claimed is:

1. A subterranean fluid transport system comprising:
   a plurality of connected pipe segments, each pipe segment having a rigid outer surface, a smooth inner surface, a first end, a second end, and a borehole extending between the first end and the second end; and
   a plurality of connected flexible inner sleeves, each flexible inner sleeve positioned in the borehole of the plurality of connected pipe segment, each flexible inner sleeve having a first end, a second end and a borehole extending between the first end and the second end of the flexible inner sleeve, wherein the flexible inner sleeve expands when the borehole of the flexible inner sleeve is filled with a fluid and contracts when the fluid is removed therefrom.

2. The subterranean fluid transport system of claim 1 further comprising:
   a system controller; and
   an automated alarm system in communication with the system controller, the automated alarm system for generating an alarm at a location remote from the plurality of connected pipe segments upon detecting fluid in the borehole of the plurality of connected pipe segments.

3. A method of installing a subterranean fluid transport system, the method comprising the steps of:
   digging a trench below a ground surface;
   positioning a plurality of pipe segments into the trench, wherein the plurality of pipe segments are connected together to form a continuous pipeline having a rigid outer surface, a smooth inner surface, a first end, a second end, and a borehole extending between the first end and the second end of the pipeline; and
   positioning a plurality of flexible inner sleeves in the borehole of the pipeline, the plurality of flexible inner sleeves connected together to form a continuous sleeve having a first end, a second end and a borehole extending between the first end and the second end of the sleeve, wherein the sleeve expands when the borehole of the sleeve is filled with a fluid and contracts when the fluid is removed therefrom.

\* \* \* \* \*